Oct. 21, 1969     H. J. SMITH     3,473,586
NUTCRACKER
Filed June 8, 1966
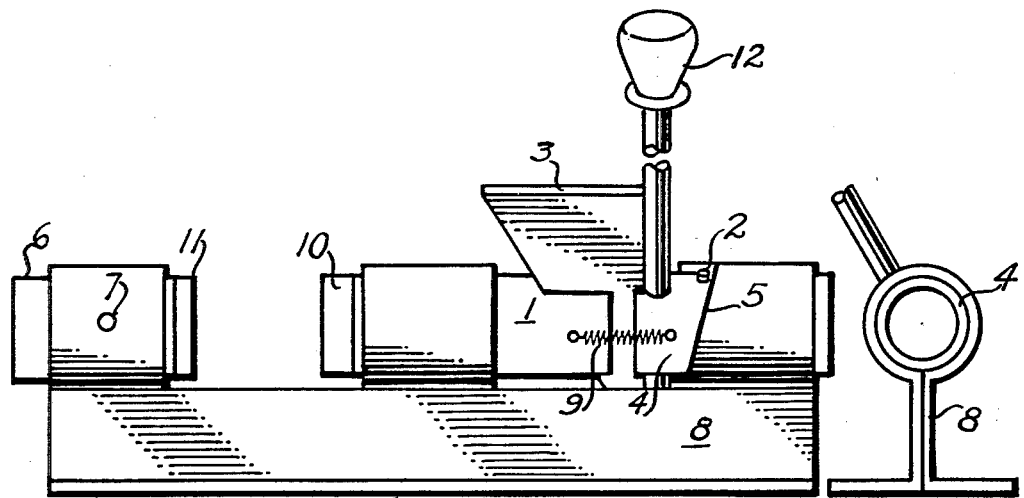
Fig. 1     Fig. 2
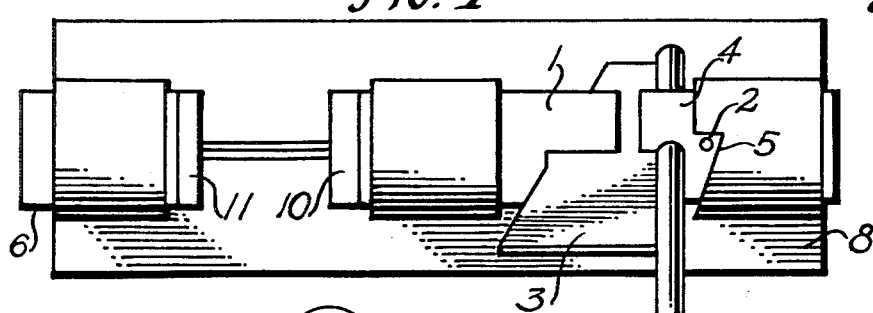
Fig. 3
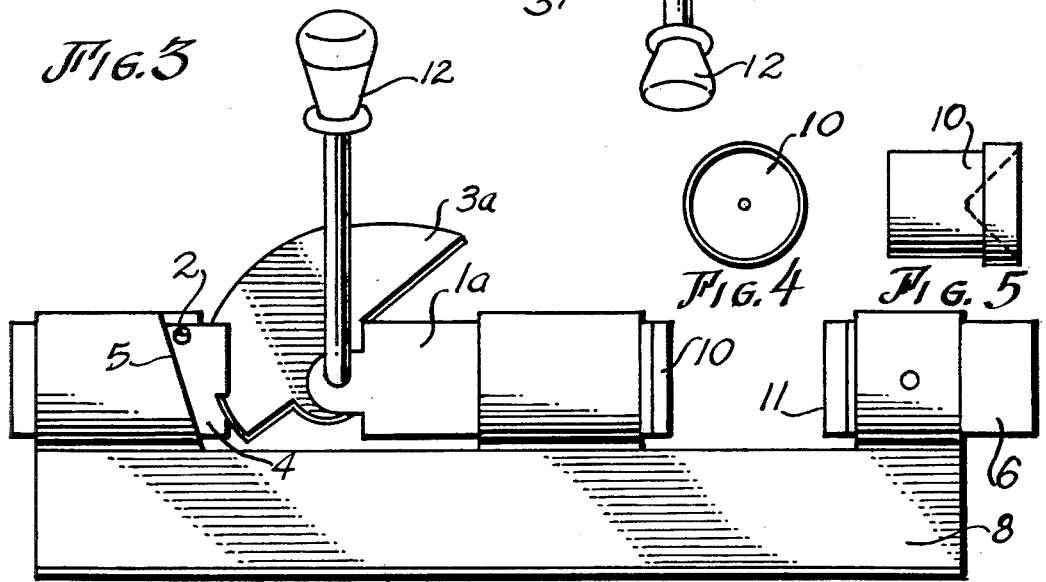
Fig. 4     Fig. 5
Fig. 6
INVENTOR
H. J. SMITH
BY
ATTORNEY

United States Patent Office 3,473,586
Patented Oct. 21, 1969

3,473,586
NUTCRACKER
H. J. Smith, 1465 30th St., Columbus, Ga. 31904
Filed June 8, 1966, Ser. No. 556,829
Int. Cl. A23n 5/02; A47j 43/26
U.S. Cl. 146—16
8 Claims

ABSTRACT OF THE DISCLOSURE

A semi-automatic, hand-operated nutcracker, which has a controlled cracking action by which nuts of various sizes can be cracked without any appreciable damage or danger of crushing the meat of the nut. This is done by a single lever which adjusts cracking cups to any size nut, and after adjustment, moves cracking cups a controlled distance to crack the nut without overcracking or crushing.

In operating a conventional lever nutcracker, the lever motion is used to cause a cracking cup to approach and contact the nut; the continuing motion after the contact causes the nut to crack. Only a small amount of stroke is left that actually cracks the nut. This results in poor mechanical advantage which calls for much greater pressure on the lever to crack the nut. Since conventional lever-operated nutcrackers require so much pressure, it is difficult for the operator to stop the lever motion after the cracking is accomplished. The result is that many nuts are overcracked and the meat is damaged.

In my invention, the entire cracking stroke is used and overcracking cannot occur since the cracking stroke starts after the nut is firmly contacted by cracking cups. The approximate 8″ travel of the lever handle is translated to movement of little over ¼ inch, giving better than 20:1 mechanical advantage. Also in my invention, undercracking does not occur. It does not occur because the entire cracking stroke is used to move the cracking cup a calibrated amount. This amount is the optimum amount for proper cracking.

BRIEF DESCRIPTION OF THE DRAWINGS

FIG. 1 is side elevation view of the nutcracker.
FIG. 2 is an end view of the nutcracker shown in FIG. 1.
FIG. 3 is a top planned view of the nutcracker shown in FIG. 1.
FIG. 4 is an end view of a cracking cup.
FIG. 5 is a side elevation view of a cracking cup.
FIG. 6 is a side elevation view of a modified form of the nutcracker.

DESCRIPTION OF THE PREFERRED EMBODIMENTS

FIGURE 1 shows nutcracker as viewed from the side, showing all parts, which are described as follows: 1 driven piston, 2 power pin, 3 cam-wedge, 4 driving piston, 5 incline, 6 stationary piston, 7 locking pin, 8 one piece body with base and guide cylinders, 9 retaining spring, movable cracking cup 10 and fixed cracking cup 11 cam-wedge handle 12.

FIGURE 2 shows the nutcracker as viewed from the end, and parts 4 and 8 of FIGURE 1. This is to illustrate that part 4 is contained inside of part 8 and is cylindrical in design and will rotate readily inside part 8 upon downward action of the cam-wedge handle 12.

Part 8 is shown one piece throughout and is inclusive of base, body, and guide cylinders.

FIGURE 3 shows nutcracker as viewed from the top to illustrate the function of cam-wedge 3 on piston 1, by causing piston 1 to move forward adjusting to the size of the nut to be cracked. As shown, this is accomplished by a spreading action when cam-wedge handle 12 is pushed between piston 1 and piston 4.

FIGURE 4 shows details of a cracking cups.

FIGURE 6 shows a modification or variation of FIGURE 1 and FIGURE 3 and illustrates the same principle, the difference being the use of a circular cam 3–A instead of wedge type cam as shown in FIGURES 1 and 3 designated as part 3. The end result in cracking a nut is identical and does not depart from the spirit of the invention.

DETAILED DESCRIPTION OF OPERATION

To operate this nutcracker, one simply grasps the cam-wedge handle 12 and starts to withdraw a cam-wedge 3 from between pistons 1 and 4. Retaining spring 9 causes piston 1 to retract, following the face of cam-wedge 3. Cracking cup 10, being attached to piston 1, is also retracted and moves away from stationary piston 6 to which cracking cup 11 it attached. When cracking cups are separated a sufficient distance in this manner, a nut is inserted between cracking cups 10 and 11. At this point said, cam-wedge handle 12 is inserted inwardly between pistons 1 and 4, moving piston 1 forward an amount necessary to cause cracking cups 10 and 11 to grasp the nut and hold it firmly. Cam-wedge handle 12, is then pushed downward, causing piston 4 to rotate in such a manner as to cause power pin 2 to ride down a stationary cylinder edge incline 5 thereby moving piston 4, cam-wedge handle 3, piston 1 movable and cracking cup 10 as a single unit toward fixed cracking cup 11 the amount of incline 5, thereby cracking the nut.

The amount of incline 5 is such that movable cracking cup 10 moves toward fixed cracking cup 11 the exact amount of incline 5 necessary for proper cracking.

It is understood that a stop could be added to control the length of the cracking stroke without departing from the spirit of the invention. However, operation of the pilot models indicated that such a stop was without merit, since the amount of incline 5 could be made such that optimum cracking distance was obtained.

I claim:
1. In a nutcracker for cracking nuts of various sizes,
    (a) a fixed jaw,
    (b) a movable jaw,
    (c) spring means normally urging said fixed and movable jaws together,
    (d) a cam member manually actuatable laterally for moving said movable jaws for adjusting the space between said jaws to receive a nut therebetween and to adjust initially for different size nuts,
    (e) manually operated means for operating said cam member laterally,
    (f) another and second means actuable by rotating said movable jaw to move said movable jaw after positioning on said nut a limited distance with a substantial mechanical advantage to crack said nut,
    (g) said second means operating said movable jaws to rotate same, and said manually operated means in (e) also being operated to rotate said movable jaw to crack said nut, whereby one manual movement of said manually operated means separates said jaws and another movement cracks the nut,
    (h) said movable jaw having a concave portion on one end thereof, said movable jaw being mounted on said base and there being support means movably supporting said movable jaw for reciprocating motion therein,
    (i) said cam member being an inclined straight edge operable against the end of said reciprocating movable jaw opposite from said concave portion and said cam being actuated by moving same across the longitudinal axis.

2. The device claimed in claim 1, wherein:
   (j) said manually operated means includes a handle,
   (k) said second means comprises an arcuate surface, and there is a second reciprocating member mounted in alignment with the end of said first movable jaw member and having engagement means thereon engageable with said arcuate surface whereby manually actuating said handle to bring said engagement means in engagement with said arcuate cam surface causes said second reciprocating member to rotate driving said first piston member a limited distance to crack said nut.

3. The device in claim 1, wherein:
   (h) said cam member is a tapered plate member and said movable jaw has a slot therein in which said plate member is operated transversely thereof and with the tapered surface causing said movable jaw to move against said spring means toward said fixed jaw when said plate is pushed in one direction and to move away from said jaw in response to said spring means when said plate is moved in the other direction.

4. The device in claim 2, wherein:
   (h) said cam member is a tapered plate member and said movable jaw has a slot therein in which said plate member is operated transversely thereof and with the tapered surface causing said movable jaw to move against said spring means toward said fixed jaw when said plate is pushed in one direction and to move away from said jaw in response to said spring means when said plate is moved in the other direction.

5. The nutcracker claimed in claim 3, wherein:
   (i) said manually operated means includes a handle attached to said plate, said handle being supported for rotation on said nutcracker as well as motion transversely of said movable jaw,
   (j) a second cam surface stationary with respect to said handle,
   (k) and a cam engagement member carried by said handle for engaging said stationary cam surface causing said handle and said plate to drive said movable jaw for a limited distance in a substantially straight line to accomplish the final limited cracking action and said cam surface limiting the extent of travel thereby controlling the cracking action to prevent uncontrolled cracking and perhaps excess destruction of the nut.

6. The nutcracker claimed in claim 5, wherein:
   (l) said stationary cam surface is the edge of a portion of a sleeve stationarily mounted with respect to said handle and said cam engagement member is a lug carried by said handle.

7. The device claimed in claim 6, wherein:
   (m) said handle has a cylindrical member attached thereto and said cam engagement member is mounted thereon,
   (n) said cylindrical member being mounted for reciprocation in said sleeve.

8. The device in claim 1, wherein said first and second means are cam means and said manually operated means is attached to operate both means in separate sequence.

References Cited
UNITED STATES PATENTS

| | | | |
|---|---|---|---|
| 40,825 | 12/1863 | Earle | 146—16 |
| 1,647,029 | 10/1927 | Williams | 146—16 |
| 2,642,908 | 6/1953 | Landgraf | 146—16 |
| 2,731,994 | 1/1956 | Snell | 146—16 |
| 3,310,083 | 3/1967 | Jennings | 146—16 |

W. GRAYDON ABERCROMBIE, Primary Examiner